United States Patent
Bergevoet

(10) Patent No.: US 8,564,414 B2
(45) Date of Patent: Oct. 22, 2013

(54) USING TAGS TO MODIFY PROGRAM BEHAVIOR

(75) Inventor: Bas Arnold Jan Bergevoet, Oosterhout (NL)

(73) Assignee: Koninklijke Philips N.V., Eindhoven (NL)

( * ) Notice: Subject to any disclaimer, the term of this patent is extended or adjusted under 35 U.S.C. 154(b) by 1137 days.

(21) Appl. No.: 11/908,021

(22) PCT Filed: Mar. 2, 2006

(86) PCT No.: PCT/IB2006/050663
§ 371 (c)(1),
(2), (4) Date: Sep. 7, 2007

(87) PCT Pub. No.: WO2006/097862
PCT Pub. Date: Sep. 21, 2006

(65) Prior Publication Data
US 2008/0252427 A1    Oct. 16, 2008

Related U.S. Application Data

(60) Provisional application No. 60/659,609, filed on Mar. 8, 2005.

(51) Int. Cl.
*H04Q 5/22*    (2006.01)
(52) U.S. Cl.
USPC .................................... 340/10.5; 340/10.1
(58) Field of Classification Search
USPC ........................... 340/10.5, 10.1, 1.1
See application file for complete search history.

(56) References Cited

U.S. PATENT DOCUMENTS

| | | | |
|---|---|---|---|
| 6,342,835 B1 * | 1/2002 | Nelson-White | 340/551 |
| 6,708,176 B2 | 3/2004 | Strunk et al. | |
| 6,760,592 B2 * | 7/2004 | Hernandez et al. | 455/456.1 |
| 6,819,939 B2 * | 11/2004 | Masamura | 455/550.1 |
| 6,967,566 B2 * | 11/2005 | Weston et al. | 340/323 R |
| 7,055,750 B2 * | 6/2006 | Carrender | 235/472.01 |
| 2002/0047860 A1 * | 4/2002 | Ceulaer et al. | 345/721 |
| 2002/0174025 A1 | 11/2002 | Hind et al. | |
| 2003/0019929 A1 * | 1/2003 | Stewart et al. | 235/385 |
| 2004/0070491 A1 * | 4/2004 | Huang et al. | 340/10.5 |
| 2004/0177072 A1 * | 9/2004 | Salminen et al. | 707/9 |
| 2004/0266419 A1 * | 12/2004 | Arling et al. | 455/420 |
| 2005/0242167 A1 * | 11/2005 | Kaario et al. | 235/375 |
| 2006/0138212 A1 * | 6/2006 | Prudent | 235/375 |

OTHER PUBLICATIONS http://en.wikipedia.org/wiki/Bluetooth; Bluetooth—Wikipedia, the free encyclopedia, pp. 1-20, Sep. 4, 2007.
http://en.wikipedia.org/wiki/Wifi; WI-FI—Wikipedia, the free encyclopedia, pp. 1-15, Sep. 4, 2007.

(Continued)

*Primary Examiner* — George Bugg
*Assistant Examiner* — Naomi Small

(57) ABSTRACT

A first electronic device (201) can gather information about itself or another electronic device (206, 208), which is preferably situated within a same room of a user premises. This information can come from an RF-ID tag (204, 207, 209) or other transmitter. The information can relate to a state or identity of the other device. The first electronic device can alter program behavior (309, 409, 509) in response to the state or identity. The program might be an entertainment type program or a software type program. The information can be used to select brand specific program code (604, 605, 606) for execution.

25 Claims, 6 Drawing Sheets

(56) References Cited

OTHER PUBLICATIONS http://en.wikipedia.org/wiki/Skin; Skin—Wikipedia, the free encyclopedia, pp. 1-13, Sep. 4, 2007.
http://en.wikipedia.org/wiki/MHP; MHP—Wikipedia, the free encyclopedia, p. 1, Sep. 4, 2007.
http://en.wikipedia.org/wiki/API; Application programming interface—Wikipedia, the free encyclopedia, pp. 1-4, Sep. 4, 2007.
http://en.wikipedia.org/wiki/Mheg; MHEG-5—Wikipedia, the free encyclopedia, pp. 1-3, Sep. 4, 2007.
http://en.wikipedia.org/wiki/OpenTV; OpenTV—Wikipedia, the free encyclopedia, pp. 1-9, Sep. 4, 2007.
http://www.nds.com/middleware/middleware.html; Middleware-MediaHighway Middleware Solutions—by NDS, pp. 1-2, 2007.
http://java.sun.com/products/javatv/overview.html; Java TAV API Overview, pp. 103, 2007.

* cited by examiner

USING TAGS TO MODIFY PROGRAM BEHAVIOR

The invention relates to the field of controlling electronic devices and to modifying their behavior responsive to the environment.

US 2002/0174025 shows a method and system for providing targeted advertising and personalized customer services. This system envisions a shopping cart with RFID-tagged products. The RFID tags trigger a wireless communication device such as a PDA, mobile phone, pager, or special shopping cart attachment device to deliver customized advertising based on what products are in the shopping cart.

It would be desirable to use transmitters attached to devices to influence behavior of devices in other ways.

For instance, a group of electronic devices premises might communicate with each other in order to affect application behavior, especially devices co-located within a user premises. Such communication might result in changes in program behavior; or changes in state of the devices; or changes in program content.

The invention will now be described by way of non-limiting example, with reference to the following figures.

Figure 5:
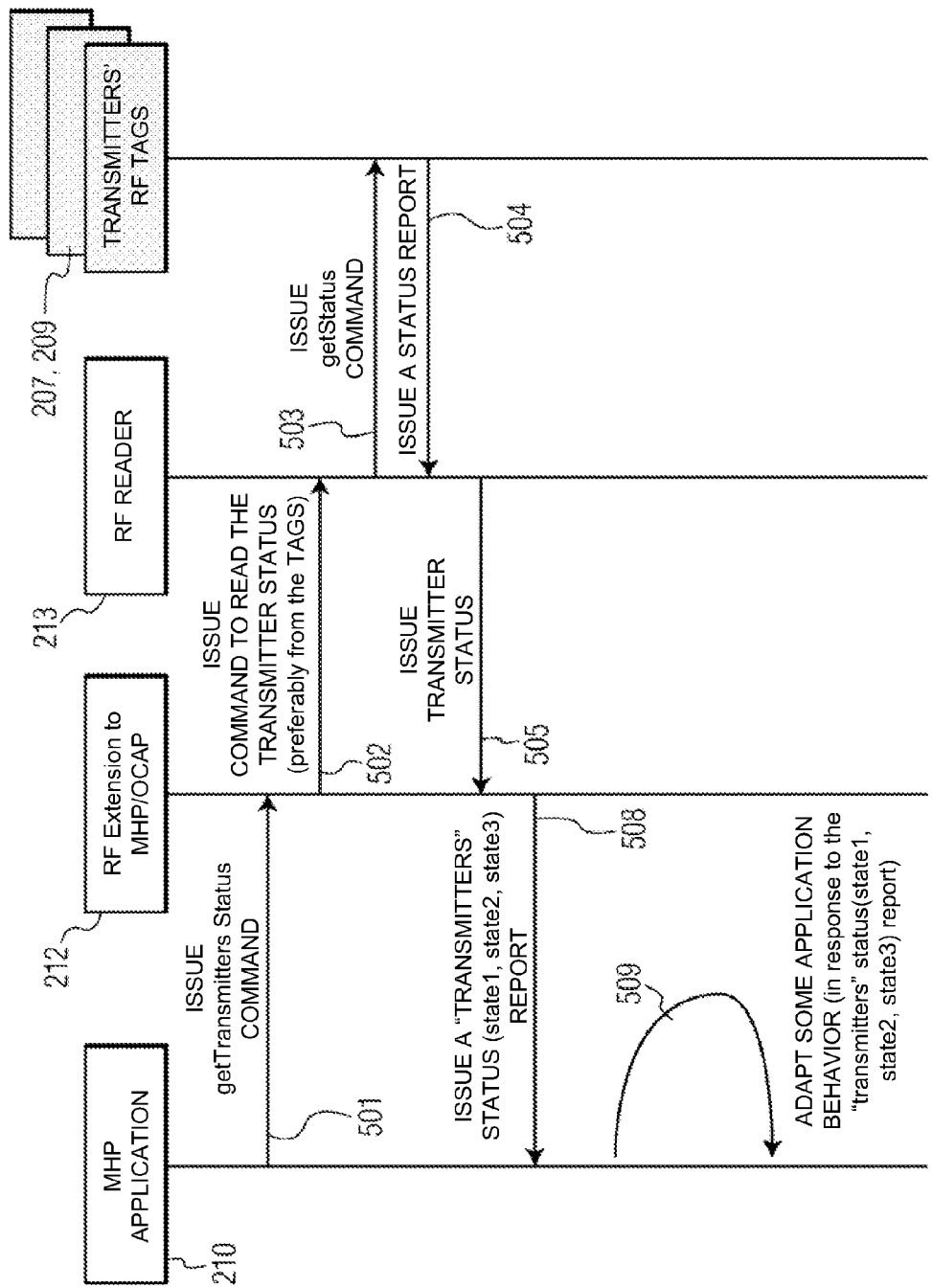

FIG. 5. shows a flow diagram for code associated with a procedure called getTransmittersStatus.

Figure 3:
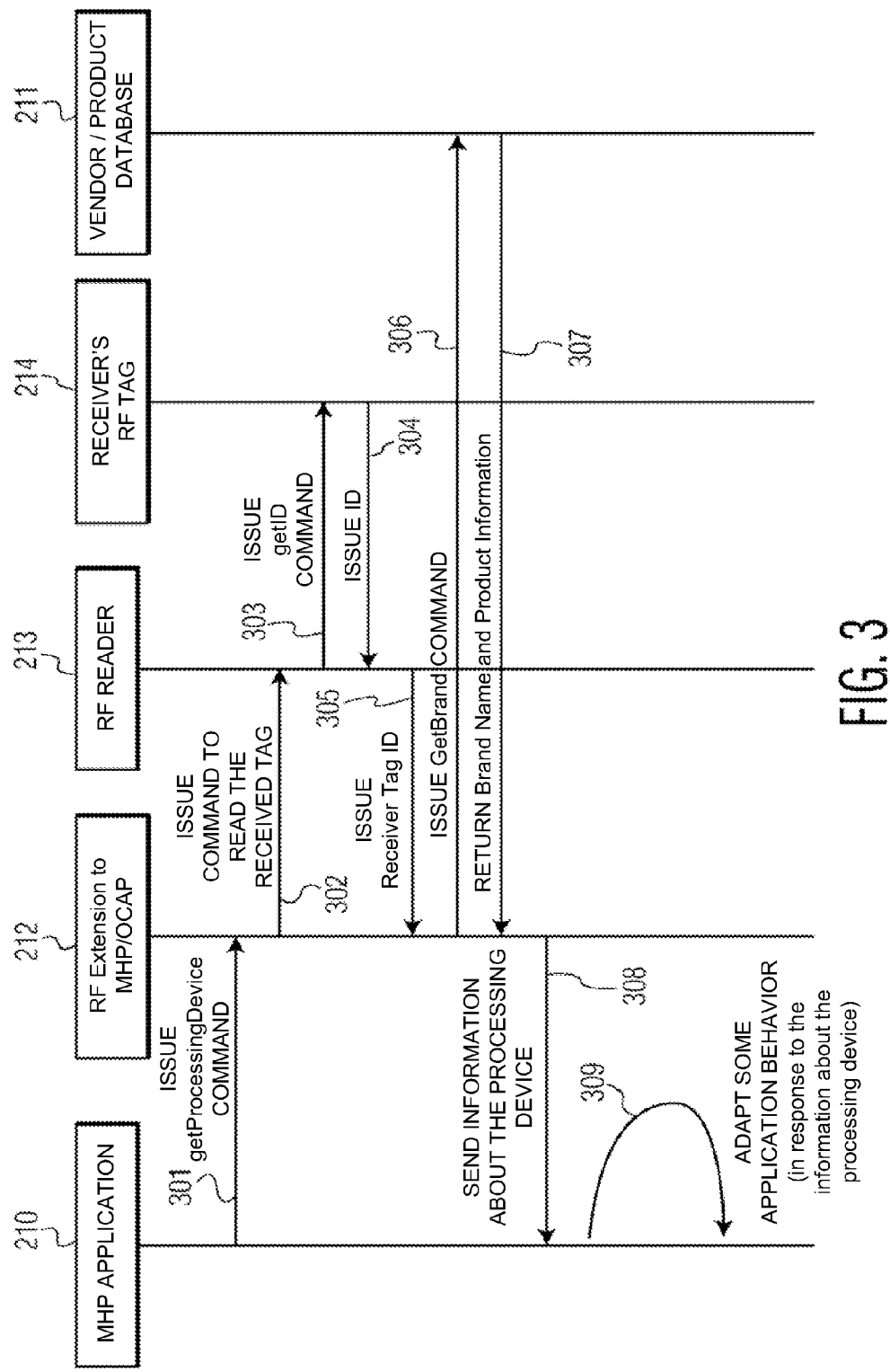
FIG. 3 shows a flow diagram for code associated with a procedure called "getProcessingDevice"
Figure 6:
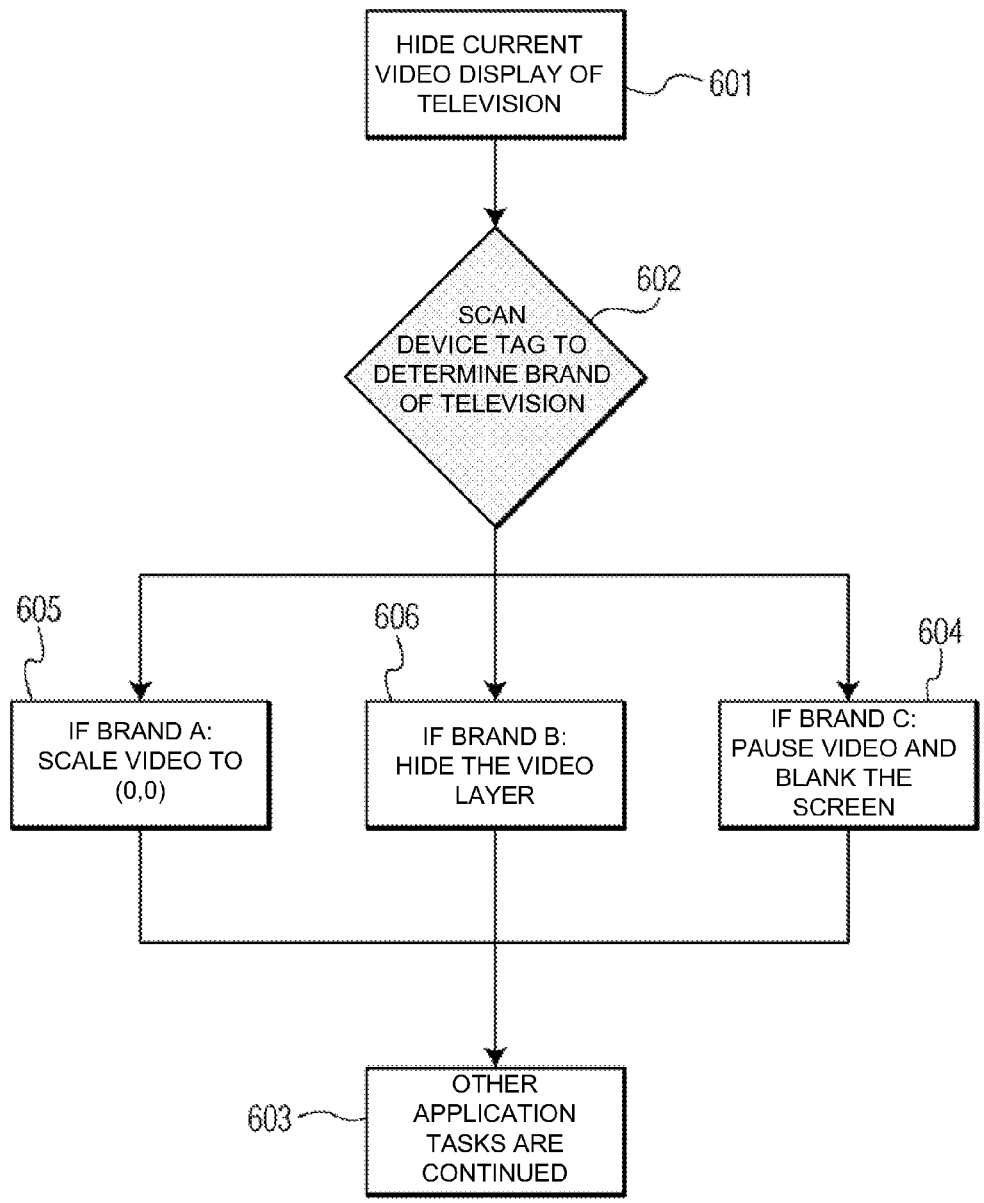

FIG. 6 shows a flow diagram suitable for use at 309 of FIG. 3.

Figure 1:
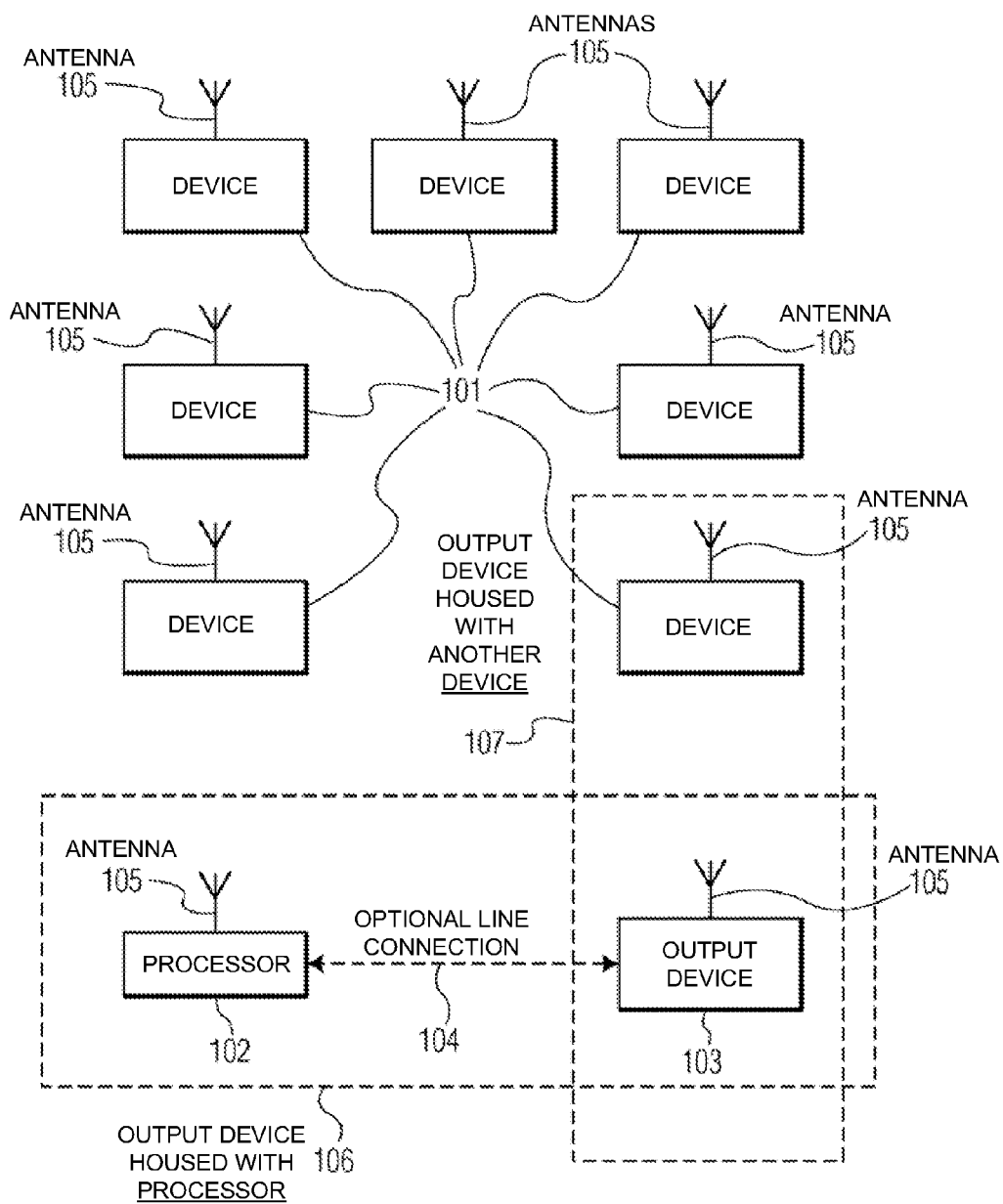
FIG. 1 shows an embodiment of a system in accordance with the invention

FIG. 1 shows an embodiment of the invention. The system includes one or more devices 101. These might be of any sort, especially consumer devices such as telephones, microwave ovens, video game platforms, televisions, or the like. The system also includes a processor 102, which also might be of any sort, such as a PC, a set top box, a digital signal processor or a general processor, optionally embedded in some consumer device. Another element of the system is an output device 103, which again might be of any suitable sort, such as a monitor, a television, a loudspeaker, or a printer. The output device 103 is illustrated as being separate from the other devices, but it might also be housed together with the processor 102 or one of the devices 101, as shown by the dotted boxes 106 and 107, respectively. The elements of the system are shown with antennas 105, which allow them to communicate wirelessly, e.g. at radio frequencies ("RF"). Other wireless technologies like the Bluetooth technology, described at http://en.wikipedia.org/wiki/Bluetooth, or Wireless Fidelity technology ("Wi-Fi"), described e.g. at http://en.wikipedia.org/wiki/Wifi could also be used to implement the system of FIG. 1. If the output device 103 is housed together with another device, it might not need its own antenna. Optionally, some of the devices may be connected via lines, such the optional connection shown as a dotted line at 104. The number of devices 101 may vary according to the user preferences.

One option for wireless communication is to use passive or active RF tags on the consumer devices 101. Preferably, the type of tag used is readable within the common dimensions of a large room, or an apartment. Such tags are preferably affixed by the manufacturer of a device, such as a consumer device, and programmed to contain an identification of the device. Manufacturers may do this for their own reasons. Alternatively, the tags may be affixed at the request of someone who wishes to implement the invention. This identification preferably includes brand name, type of product, and a serial or model number. The processor could then access some sort of database, whether local or remote, to get other information about the device. This database might be as simple as a table within the receiving device, or as complex as a remote server.

Examples of information the tag could provide are:
brand name and type of product;
serial number or model number;
state, e.g. powered on/off, in use, idle, error, etc.;
purchase date, to calculate age of devices;
color or shape, so that an application can coordinate its colors with preferred colors in the user premises—for instance, if everything is red, then the processor might choose red as a background color; and
value, because expensive devices tell something about the atmosphere in the user premises.

Purchase date, color, shape and value can all be regarded as examples of states of the device. If privacy of the owner of the device is desired, the tags could omit any personal identifying information relating to the owner.

Various changes in program behavior might result from such states.

For example, if the application, see 210 discussed below, is running inside a television and detects both that one of the devices 101 is a telephone and that the state of the telephone is ringing, the application 210 might issue a control command to lower the volume of the television so that the user can hear the ringing. This is an example of an audio output device changing its audio output in response to a state of another device.

Similarly, if the application 210 is running within a television and detects that a microwave oven is on in the user premises, the application 210 might signal the television to tune to a cooking program. This is an example of a consumer device choosing a transmitted signal in response to a state of anther device.

In still another example, if a video game player is detected in the room, the application 210 could make its skin, or other visual attribute, to look like the video game that is currently playing. More about skin can be found at http://en.wikipedia.org/wiki/Skin %28computing%29 Similarly, suppose the application 210 has several skins and wants to select one for every specific user. For this, it scans the status of all tags around the receiver. Suppose it finds two black phones, a metallic microwave and a silver game console. It could use this color information to select a skin that has a metallic look. This might be expected to be aesthetically pleasing to the user, since the user has other devices with metallic looks. Analogously, if several oval devices are in the room, a skin with oval theme can be selected. These are examples of a device changing a visual attribute in response to a state of another device.

If a transmitted program has selectable plot or character options, those might also be selected responsive to devices in the room. For instance, if children's toys are detected, plot or character options more suitable to children might be presented.

Figure 2:
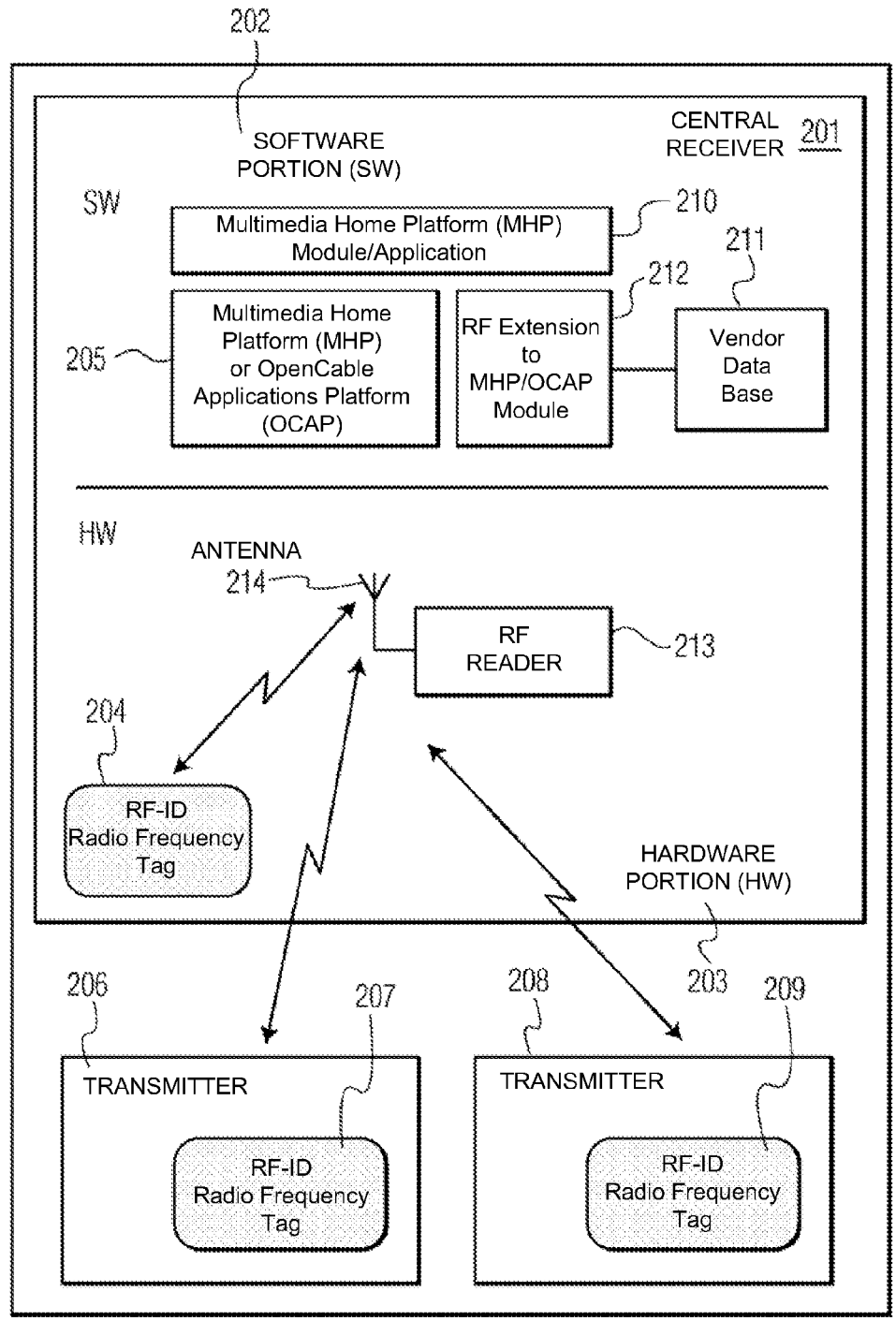
FIG. 2 shows an embodiment of a system in accordance with the invention.

FIG. 2 shows an embodiment of the invention. In this embodiment there is a central receiver 201 and two transmitters 206, 208. These contain RF (Radio Frequency) tags 204, 207, and 209, respectively. RF-ID tags currently have short range, such as less than 1 meter. Accordingly, these would operate best within the shelves of a home theater. Other longer-range technologies could extend to an entire room or apartment. The receiver 201 has a software (SW) portion 202 and a hardware (HW) portion 203.

The antenna 214 receives RF signals from all three tags 204, 207, and 209, i.e. including from the tag of its own device. Accordingly, the RF reader 213 can act on all of this data.

The receiver 201 will need to distinguish its own tag 204 from the tags 207, 209 of the other devices. There are several ways in which this might be accomplished.

- A. Signal strength can be used as a heuristic to estimate position of RF-ID tags. The one closest to the receiver, i.e. the one with the greatest signal strength, is the one most likely to be the receiver's own tag 204. Current RF-ID software already provides the capacity to query the signal strength of a received signal. This heuristic is not 100% fail safe, however. One of the devices 206, 208 might be positioned immediately adjacent to the receiver, 201, for instance on the same shelf of a home theater or book case. In such a case, the other device's tag 207, 209 could be closer to the antenna 214 than the receiver's own tag 204.
- B. Another possible way to distinguish the tag 204 from the tags 207, 209, would be an algorithm that determines from all the types of devices near the receiver, which one most likely is the receiver's own. For instance, if one assumes a TV, a telephone, and a game station are detected; the algorithm could decide that the TV is most likely the device that has the RF reader integrated, so it will consider the TV's RF tag as the receiver's own tag.
- C. A combination of A. & B. would probably give better reliability than either separately.
- D. The receiver's own tag might also have a direct connection with the RF reader, for instance a wired connection. This way the receiver could be 100% sure which tag is its own. However, this would involve greater expense and inconvenience for manufacturers, and therefore their compliance would be hard to obtain.
- E. Conceivably, the tags might have some kind of positioning system, like the Global Positioning System (GPS) such that all tags would have positional coordinates that they could transmit to the receiver.
- F. Alternatively, application 210 might be programmed to know that it is in a particular type of device, such as a television, and therefore look for the closest tag identifying that type of device—and assume that that is the tag associated with the receiver.

The SW portion includes several modules.

One is a Multimedia Home Platform (MHP) 205 or Open-Cable Applications Platform (OCAP). More information about MHP can be found at http://en.wikipedia.org/wiki/MHP OCAP is a similar system to MHP, but intended for the US market.

A second is the MHP application 210, which will be discussed further below.

Figure 4:
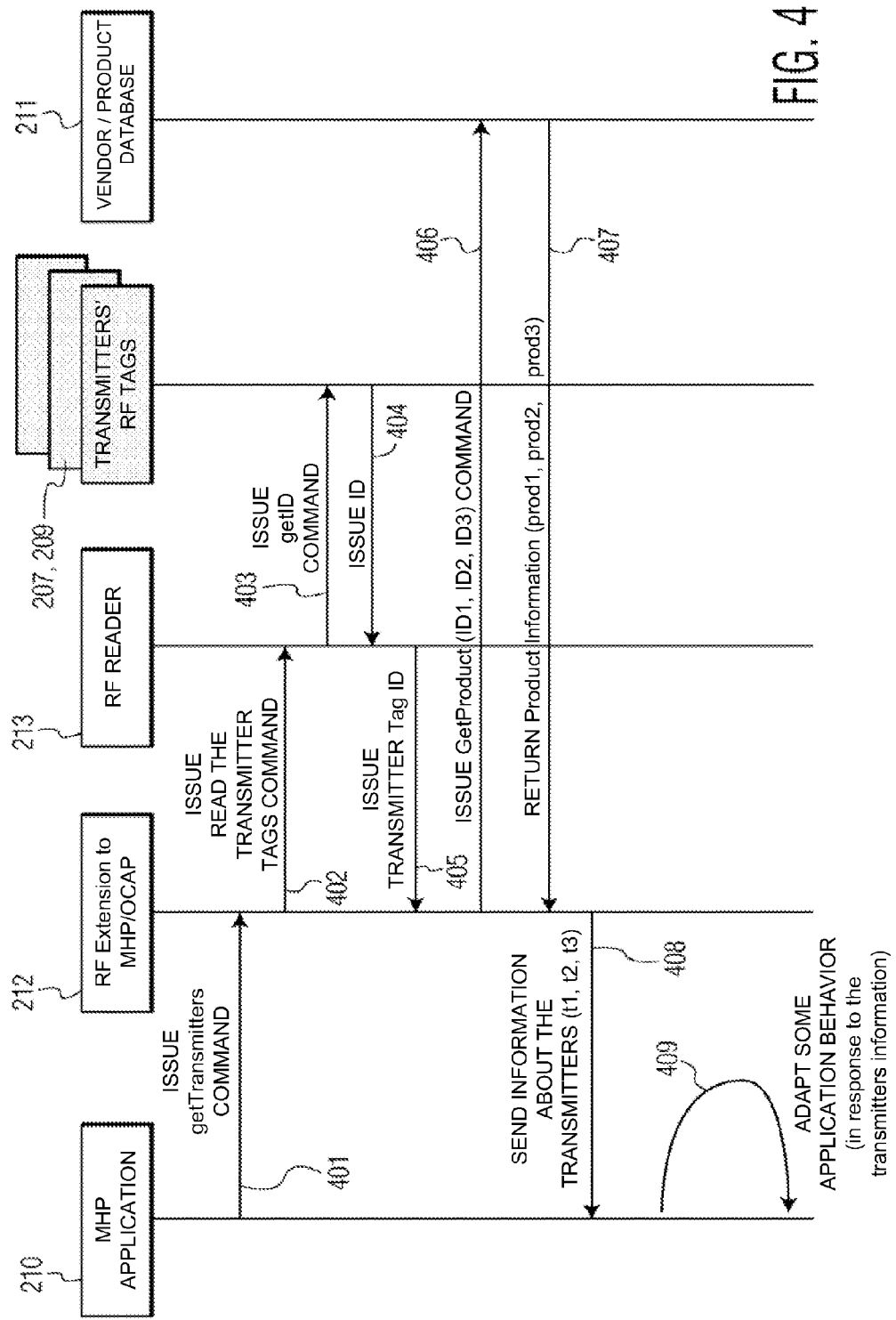
FIG. 4 shows a flow diagram for code associated with a procedure called getTransmitters.

A third module is the RF extension to the MHP/OCAP 212, which obtains an identification number (ID) from the RF tags 207,209 associated with the various devices. If an application 210 can know on which brand it is running on, it can execute the program code that works for this specific brand. The module 212 is an Application Program Interface (API). More information about API's can be found at http://en.wikipedia.org/wiki/API. The API interacts with a vendor data base 211. Code associated with the API and used to gather information as part of the invention is illustrated with respect to FIGS. 3-5. FIG. 3 is useful for MHP interoperability, in other words, making sure that MHP applications can run on any brand hardware. FIG. 4 is useful for finding out characteristics of the environment of the user premises. FIG. 5 gives a more detailed picture of the environment by retrieving more details from the devices in the neighborhood.

The invention could also be used in the context of an ordinary application, not based on MHP or OCAP middleware. In that case, instead of the RF extension to MHP/OCAP, there would be a software library.

FIG. 3 illustrates the operation of a procedure to collect information about the device 201 and adapt application behavior in response. First the MHP application 210 issues the "getProcessingDevice" command 301. This triggers the RF extension to MHP/OCAP 212 to issue a command 302 to read the receiver tag. This command 302 in turn triggers the RF reader 213 to issue a Get ID command 303. This command 303 triggers the receiver's RF tag 214 to issue an ID at 304. This ID 304 then triggers the RF reader 213 to issue at 305 the receiver tag ID to the RF extension to the MHP/OCAP 212. Block 212 then issues a "getBrand" command at 306 to get the brand associated with the receiver tag ID from the Vendor/product database 211. The database then returns the Brand name and product identification at 307 to the RF extension to the MHP/OCAP 212, which then sends information about the processing device at 308 to the MHP application 210. The MHP application 210 then adapts some application behavior at 309.

FIG. 4 illustrates the operation of a procedure to collect information about the transmitting devices 206 and 208 and adapt application behavior in response. While FIG. 2 only shows 2 transmitters, three transmitters are illustrated in FIG. 4, but the same reference numbers are used to show correspondence with FIG. 2. First the MHP application 210 issues the "getTransmitters" command 401. This triggers the RF extension to MHP/OCAP 212 to issue a command 402 to read the transmitter tags 207, 209. This command 402 in turn triggers the RF reader 213 to issue a Get ID command 403. This command 403 triggers the transmitters' RF tags 207, 209 to issue an ID at 404. This ID 404 then triggers the RF reader 213 to issue at 405 the transmitter tag ID to the RF extension to the MHP/OCAP 212. Block 212 then issues a "getProduct (ID 1, ID 2, ID 3)" command at 406 to get the brand associated with transmitter tag ID from the Vendor/product database 211. The database then returns the product identification (prod 1, prod 2, prod 3) at 407 to the RF extension to the MHP/OCAP 212, which then sends information about the Transmitters (t1, t2, t3) at 408 to the MHP application 210. The MHP application 210 then adapts some application behavior at 409.

FIG. 5 illustrates the operation of a procedure to collect status information about the transmitting devices 206 and 208 and adapt application behavior in response. As in FIG. 4, three transmitters are illustrated in FIG. 5, but the same reference numbers are used for the transmitters to show correspondence with FIG. 2. Again, any number of transmitters may actually be used. First the MHP application 210 issues the "getTransmittersStatus" command 501. This triggers the RF extension to MHP/OCAP 212 to issue a command 502 to read the transmitter status, preferably from the tags 207, 209. This command 502 in turn triggers the RF reader 213 to issue a Get status command 503. This command 503 triggers the transmitters' RF tags 207, 209 to issue a status report at 504. This status 504 then triggers the RF reader 213 to issue at 505 the transmitter status to the RF extension to the MHP/OCAP 212. Block 212 then issues a "transmitters' status (state1, state2, state3)" report at 508. The MHP application 210 then adapts some application behavior at 509.

MHP is an application execution environment that is independent of the underlying, vendor-specific hardware. This means that MHP applications, shown at 210, theoretically should be able to run on any MHP hardware of any brand. This is the theory, but in practice it is very hard to write applications that work on all brands. Some program code needs to be different for different brands.

An example of this is to be found in FIG. 6. At 601, the receiver 201 decides that, in order to draw something on a display screen, it must hide the current video display of a television. How this is to be done will depend on the brand of the television. The MHP application 210 is designed to be general purpose therefore it has code for several brands to allow it to hide video in different ways dependent on the design of the various brands. At 602, the receiver scans its own device tag—or what it believes to be its own device tag—to determine what brand of television it finds itself in. If it determines that it is in a Brand A television, then at 605 it will issue a command to scale the video to (0,0). If a Brand B television is detected, than at 606 the MHP 210 will issue a command to hide the video layer. If a Brand C television is detected, than at 604 the MHP 210 will issue commands to pause the video and blank the screen. After the appropriate command is issued, control proceeds to 603, where other application tasks are continued.

The embodiments described above relate to an MHP application. The invention could also be applied to a PC environment, with a PC application running under an operating system such as Windows, rather than an MHP application. The Windows environment would have to be extended with the RF extension API. Other intelligent appliances such as mobile phones and PDAs might implement the invention as well. Other types of middleware software could be used instead of MHP/OCAP, such as the standards devised by the Multimedia and Hypermedia information coding Expert Group ("MHEG") as described in http.//en.wikipedia.org/wiki/Mheg, OpenTV as described in http://en.wikipedia.org/wiki/OpenTV, MediaHighway http://www.nds.com/middleware/middleware.html, Liberate available from http://www.liberate.com/, or JavaTV described at http://java.sun.com/products/javatv/overview.html.

From reading the present disclosure, other modifications will be apparent to persons skilled in the art. Such modifications may involve other features which are already known in the design, manufacture and use of control of electronic devices and methods for altering program behavior in response to outside data and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. The word "or" should be construed as an inclusive or, in other words as "and/or".

The invention claimed is:

1. A system comprising:
at least one output device;
at least one central receiver having an identification tag, the central receiver further including a Multimedia Home Platform (MHP) module, a MHP application, an RF extension to the MHP module, a vendor/product database, and an RF reader; and
at least one processor adapted to execute operations, wherein the output device is housed with one selected from the group consisting of the processor and another device situated in the system, further wherein the operations executed by the processor including:
polling with use of the central receiver situated in the system via the MHP application, the RF extension to the MHP module, and the RF reader to identify (i) identification tag signals of (i)(a) its own identification tag and (i)(b) at least one other device situated near the system and (ii) state signals from transmitters associated respectively with (ii)(a) the central receiver situated in the system and (ii)(b) the at least one other device situated near the system;
identifying both (i) a brand of the central receiver situated in the system via the vendor/product database and (ii) a type of the at least one other device situated near the system, respectively, in response to the identified identification tag signals;
determining a state of the at least one other device situated near the system in response to the identified state signals; and
adapting, via the processor executing the MHP application having an application execution environment that is independent of an underlying vendor-specific hardware of the central receiver, both (l) an application behavior of the MHP application within the central receiver according to the underlying vendor-specific hardware of the central receiver based on the identified brand of the central receiver, and (ll) an output of the output device based on both the (a)(i) identified type of the at least one other device situated near the system and (a)(ii) determined state of the at least one other device situated near the system, wherein adapting the output of the output device results in changes in both (b)(i) a state of the output device and (b)(ii) a content being output by the output device.

2. The system of claim 1, wherein the state includes a shape or color attribute of the at least one other device.

3. The system of claim 1, wherein the state includes a value of the at least one other device.

4. The system of claim 1, wherein the state includes whether the at least one other device is in operation.

5. The system of claim 1, wherein the state includes purchase date information about the at least one other device.

6. The system of claim 1, wherein
the output device comprises an audio output device; and
the adapting comprises changing a sound of the audio output device in response to the state.

7. The system of claim 6, wherein
the processor is located within a consumer electronics device;
the at least one other device comprises a telephone;
the state of the telephone is ringing;
the adapting comprises lowering the volume of the consumer electronics device, so that a user can hear the telephone ringing.

8. The system of claim 1 wherein
the output device comprises a video output device; and
the adapting comprises changing a visual attribute on the video output device to coordinate aesthetically with the state.

9. The system of claim 8, wherein the visual attribute is a skin.

10. The system of claim 1 wherein the adapting comprises selecting transmitted programming relating to the state.

11. The system of claim 1 wherein the transmitters have a range comparable with an expected size of a room in a user premises.

12. The system of claim 11, wherein the transmitters are bluetooth based.

13. The system of claim 11, wherein the transmitters are WiFi based.

14. The system of claim 1, wherein the transmitters are RF tags.

15. A method comprising executing the following operations in a data processing device:
polling with use of a central receiver situated in and associated with the data processing device via a Multimedia Home Platform (MHP) module, an MHP application, an RF extension to the MHP module, and an RF reader of the central receiver to identify (i) identification tag signals of (i)(a) its own identification tag and (i)(b) at least one other device situated near the data processing device and (ii) state signals from transmitters associated respectively with (ii)(a) the central receiver situated in and associated with the data processing device and (ii)(b) the at least one other device situated near the data processing device;
identifying both (i) a brand of the central receiver situated in and associated with the data processing device via vendor/product database of the central receiver and (ii) a type of the at least one other device situated near the data processing device, respectively, in response to the identified tag signals;
determining a state of the at least one other device situated near the data processing device in response to the identified state signals; and
adapting, via a processor executing the MHP application having an application execution environment that is independent of an underlying vendor-specific hardware of the central receiver, both (l) an application behavior of the MHP application within the central receiver according to the underlying vendor-specific hardware of the central receiver based on the identified brand of the central receiver, and (ll) an output of an output device based on both the (a)(i) identified type of the at least one other device situated near the data processing device and (a)(ii) determined state of the at least one other device situated near the data processing device, wherein adapting the output of the output device results in changes in both (b)(i) a state of the output device and (b)(ii) a content being output by the output device.

16. A non-transitory medium, readable by a data processing device, and embodying code adapted to cause the data processing device to perform the following operations:
polling with use of a central receiver situated in and associated with the data processing device via a Multimedia Home Platform (MHP) module, an MHP application, an RF extension to the MHP module, and an RF reader of the central receiver to identify (i) identification tag signals of (i)(a) its own identification tag (i)(b) at least one other device situated near the data processing device and (ii) state signals from transmitters associated respectively with(ii)(a) the central receiver situated in and associated with the data processing device and (ii)(b) at least one other device situated near the data processing device;
identifying both (i) a brand of the central receiver situated in and associated with the data processing device via a vendor/product database of the central receiver and (ii) a type of the at least one other device situated near the data processing device, respectively, in response to the identified tag signals;
determining a state of the at least one other device situated near the data processing device in response to the identified state signals; and
adapting, via a processor executing the MHP application having an application environment that is independent of an underlying vendor-specific hardware of the central receiver, both (l) an application behavior of the MHP application within the central receiver according to the underlying vendor-specific hardware of the central receiver based on the identified brand of the central receiver, and (ll) an output of an output device based on both the (a)(i) identified type of the at least one other device situated near the data processing device and (a) (ii) determined state of the at least one device situated near the data processing device, wherein adapting the output of the output device results in changes in both (b)(i) a state of the output device and (b)(i) a content being output by the output device.

17. A system comprising:
at least one central receiver having an identification tag, the central receiver further including a Multimedia Home Platform (MHP) module, a MHP application, an RF extension to the MHP module, a vendor/product database, and an RF reader; and
at least one processor adapted to execute operations including:
polling with use of the central receiver via the MHP application, the RF extension to the MHP module, and the RF reader to identify (i) identification tag signals of (i)(a) its own identification tag and (i)(b) at least one other device situated near the system and (ii) state signals from transmitters associated, respectively, with (ii)(a) the central receiver and (ii)(b) at least one other device situated near the system;
identifying both (i) a brand of the central receiver via the vendor/product database and (ii) a type of the at least one other device situated near the system, respectively, in response to the identified tag signals; and
adapting, via the processor executing the MHP application having an application execution environment that is independent of an underlying vendor-specific hardware of the central receiver, both (l) an application behavior of the MHP application within the central receiver according to the underlying vendor-specific hardware of the central receiver based on the identified brand of the receiver, and (ll) an output of an output device within the system based on both (a)(i) the identified type of the at least one other device situated near the system and (a)(ii) a determined state of the at least one other device situated near the system, wherein adapting the output of the output device includes choosing a software behavior, resulting in both (b)(i)changes in a state of the output device and (b)(ii) changes in a content being output by the output device.

18. The system of claim 17, wherein choosing software behavior comprises changing flow of control of the software.

19. The system of claim 18, wherein the other device contains a transmitter and also contains the central receiver, and changing the flow of control of the software comprises adapting general purpose software to operate in accordance with the requirements of the one other device.

20. The system of claim 19, wherein the central receiver is adapted to use a heuristic or algorithm to determine whether the transmitter is in the same device with the central receiver.

21. A method comprising executing operations in a data processing device, the operations comprising:
    polling with use of a central receiver situated in and associated with the data processing device via Multimedia Home Platform (MHP) module, an MHP application, an RF extension to the MHP module, and an RF reader of the central receiver to identify (i) identification tag signals of (i)(a) its own identification tag and (i)(b) at least one other device situated near the data processing device and (ii) state signals from transmitters associated respectively with (ii)(a) the central receiver situated in and associated with the data processing device and (ii)(b) the at least one other device situated near the data processing device;
    identifying both (i) a brand of the central receiver situated in and associated with the data processing device via a vendor/product database of the central receiver and (ii) a type of the at least one other device situated near the data processing device, respectively, in response to the identified tag signals; and
    adapting, via a processor executing the MHP application having an application execution environment that is independent of an underlying vendor-specific hardware of the central receiver, both (l) an application behavior of the MHP application within the central receiver according to the underlying vendor-specific hardware of the central receiver based on the identified brand of the central receiver, and (ii) an output of an output device based on both (a)(i) the identified type of the at least one other device situated near the data processing device and (a)(ii) a determined state of the at least one other device situated near the data processing device, wherein adapting the output of the output device results in changes in both (b)(i) a state of the output device and (b)(ii) a content being output by the output device.

22. A non-transitory medium embodying code readable by a data processing device and adapted to cause execution of operations comprising:
    polling with use of central receiver situated in and associated with the data processing device via a Multimedia Home Platform (MHP) module, an MHP application, an RF extension on the MHP module, and an RF reader of the central receiver to identify (i) identification tag signals of (i)(a) its own identification tag and (i)(b) at least one other device situated near the data processing device and (ii) state signals from transmitters associated with (ii)(a) the central receiver situated in and associated with the data processing device and (ii)(b) the at least one other device situated near the data processing device;
    identifying both (i) a brand of the central receiver situated in and associated with the data processing device via a vendor/product database of the central receiver and (ii) a type of the at least one other device situated near the data processing device, respectively, in response to the identified tag signals; and
    adapting, via a processor executing the MHP application having an application execution environment that is independent of an underlying vendor-specific hardware of the central receiver, both (l) an application behavior of the MHP application within the central receiver according to the underlying vendor-specific hardware of the central receiver based on the identified brand of the central receiver, and (ll) an output of an output device based on both (a)(i) the identified type of the at least one other device situated near the data processing device and (a)(ii) a determined state of the at least one other device situated near the data processing device, wherein adapting the output of the output device results in changes in both (b)(i) a state of the output device and (b)(ii) a content being output by the output device.

23. A consumer electronics device for customizing content, comprising:
    at least one output device;
    at least one central receiver, the central receiver further including a Multimedia Home Platform (MHP) module, a MHP application, an RF extension to the MHP module, a vendor/product database, and an RF reader; and
    at least one processor adapted to execute operations including:
        polling with use of the central receiver situated in and associated with the consumer electronics device via the MHP application, the RF extension to the MHP module, and the RF reader to identify (i) identification tag signals of (i)(a) its own identification tag and (i)(b) at least one other consumer electronics device situated near the consumer electronics device and (ii) state signals from transmitters associated with (ii)(a) the central receiver situated in and associated with the consumer electronics device and (ii)(b) the at least one other consumer electronics device situated near the consumer electronics device within a user premises;
        identifying both (i) a brand of the central receiver situated in and associated with the consumer electronics device via the vendor/product database and (ii) a type of the at least one other consumer electronics device situated near the consumer electronics device in response to the identified tag signals;
        customizing content based on both (i) the brand of the central receiver and (ii) the type of the at least one other consumer electronics device, wherein customizing content includes adapting via the processor executing the MHP application having an application execution environment that is independent of an underlying vendor-specific hardware of the central receiver, both (l) an application behavior of the MHP application according to the underlying vendor-specific hardware of the central receiver based on the identified brand of the central receiver, and (ll) an output of an output device of the consumer electronics device based on (a)(i) the identified type of the at least one other consumer electronic device and (a)(ii) a determined state of the at least one other consumer electronics device situated near the consumer electronics device, wherein adapting the output of the output device results in changes in both (b)(i) a state of the output device and (b)(ii) a content being output by the output device; and
        causing the customized content to be presented on the output device.

24. The system of claim 23 wherein customizing content comprises causing selection of a broadcast signal from amongst a plurality of possible broadcast signals.

25. The system of claim 24 wherein customizing content comprises choosing plot variations in entertainment style programming.

* * * * *